United States Patent [19]
Hirt et al.

[11] Patent Number: 4,615,239
[45] Date of Patent: Oct. 7, 1986

[54] SHIP GEAR TRAIN ARRANGEMENT

[75] Inventors: Manfred Hirt; Eric John, both of Augsburg, Fed. Rep. of Germany

[73] Assignee: Zahnraderfabrik Renk AG, Fed. Rep. of Germany

[21] Appl. No.: 663,898

[22] Filed: Oct. 23, 1984

[30] Foreign Application Priority Data

Oct. 27, 1983 [DE] Fed. Rep. of Germany ....... 3338950

[51] Int. Cl.⁴ ...................... F16H 47/00; F16H 47/08
[52] U.S. Cl. ...................... 74/720; 74/688; 74/730
[58] Field of Search ............ 74/688, 720, 720.5, 74/764, 730; 192/58 A; 60/357

[56] References Cited

U.S. PATENT DOCUMENTS

| 2,690,052 | 9/1954 | Oding | 60/357 X |
| 3,055,233 | 9/1962 | Giles | 74/688 X |
| 3,557,743 | 1/1971 | Rubis | 115/34 |
| 4,147,075 | 4/1979 | Rasman et al. | 74/720.5 X |
| 4,296,645 | 10/1981 | Jameson | 74/688 |
| 4,305,710 | 12/1981 | Schneider | 74/720.5 X |

FOREIGN PATENT DOCUMENTS

| 1802456 | 5/1969 | Fed. Rep. of Germany . |
| 2913375 | 8/1980 | Fed. Rep. of Germany . |
| 3109871 | 10/1982 | Fed. Rep. of Germany . |
| 1099641 | 9/1955 | France | 74/720 |
| 1178133 | 5/1959 | France | 74/720 |
| 1362762 | 12/1964 | France | 74/720 |
| 2508584 | 12/1982 | France . |
| 1013602 | 12/1965 | United Kingdom | 74/720 |
| 1204238 | 9/1970 | United Kingdom | 74/720 |
| 2109488 | 6/1983 | United Kingdom . |
| 2115089 | 9/1983 | United Kingdom | 74/720.5 |

OTHER PUBLICATIONS

High-Power Variable-Ration Epicyclic Gear—"The Marine Engineer and Naval Architect", 1964.

Primary Examiner—Kenneth J. Dorner
Assistant Examiner—Dirk Wright
Attorney, Agent, or Firm—Larson & Taylor

[57] ABSTRACT

A ship gear train arrangement includes a differential gearing between a main input shaft and output shaft and a parallel shaft with a hydrodynamic coupling (50). The parallel shaft connects a point (at 60) of the main input shaft on the input side (30) of the differential gearing with a reaction element (16) of the differential gearing. The coupling effect and thus also the speed of output shaft (32) of the ship gear train arrangement can be changed smoothly down to zero speed by variation of the liquid level in the hydrodynamic coupling. The ship propeller can therefore be driven at a speed far lower than the lowest speed of the ship main drive motor.

4 Claims, 3 Drawing Figures

SHIP GEAR TRAIN ARRANGEMENT

FIELD OF THE INVENTION

The invention relates to a ship gear train arrangement with differential gearing in the main input shaft.

BACKGROUND OF THE INVENTION

With known ship gear train arrangements the differential gearing normally consists of one or more planetary gear trains. Therefore one planetary gear train is provided for forward motion and another planetary gear train is provided for reverse motion.

The main drive motor of the ship can only run and give power when it runs with a certain minimum speed, otherwise it is "strangled." The lowest possible speed of the ship's propellers is given by the lowest gearing of the ship gear train and the lowest motor speed. In order to be able to positively drive the ship propeller smoothly with a still lower speed, down to zero, a hydrodynamic coupling with variable liquid level is arranged in a known position in the main input shaft between ship motor and geared reduction gear. The slippage between its primary part and its secondary part can be varied by changing the filling level (liquid volume) of the hydrodynamic coupling. The minimum slippage occurs at the highest level, i.e. with completely filled coupling. The maximum slippage, in which the secondary part of the coupling no longer rotates at all, occurs when the coupling is completely emptied, in which case the ship propeller is no longer driven by running the main drive motor. One great drawback is that the hydrodynamic coupling must transmit the entire drive torque of the ship and for that reason must be constructed three-dimensionally approximately as large as the mechanical reduction gear train. Another drawback is that the hydrodynamic coupling then also has slippage which means a loss of power between its primary part and its secondary part, even when it is completely filled with liquid.

SUMMARY OF THE INVENTION

The ship gear train arrangement is so constructed according to the invention that the propeller speed can be adjusted smoothly down to zero, and it works without power loss during normal drive.

This is attained according to the invention in that a hydrodynamic coupling with variable liquid level is arranged in a parallel arm which connects a point of the main gear train on the drive side of the differntial gearing with a reaction element of the differential gearing, and its speed influences the main input shaft-output speed of the differential gearing.

This has the advantage that the hydraulic brake need transmit only a low power and thus can be much smaller than the hydrodynamic coupling of the known gear train arrangement. Furthermore, there is no longer a loss of power in the main input shaft because it now no longer needs to include a hydrodynamic coupling.

The hydrodynamic couplings cited hereinafter are preferably known as hydrodynamic structures, but could also be known as hydrostatic structural units.

One basic concept of the invention thus resides in that a certain additional speed which is taken from the main input shaft is to be superposed on the differential gearing for the speed regulation of the ship propeller in the low speed range, and a hydraulic transmission element is used for this purpose. Indeed it is known to superpose a speed on the planetary gear trains of tracked vehicles, as disclosed in DE Pat. No. 17 55 026.

BRIEF DESCRIPTION OF THE DRAWINGS

Several embodiments of the invention are shown diagrammatically in the drawings and are described in the following. In these.

DETAILED DESCRIPTION OF THE PREFERRED EMBODIMENTS

Figure 1:
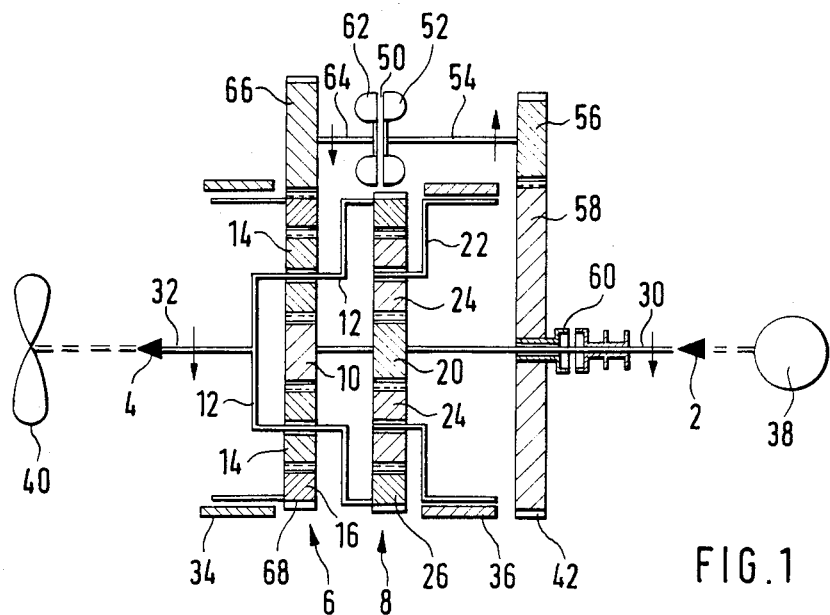
FIG. 1 is a ship gear train arrangement according to the invention with a device for regulation of the lower output speeds using input and output shafts rotating in the same direction.

Arrows 2 and 4 in the drawings show the direction of the power flow. The other arrows show the direction of rotation of the individual gear train parts, the solid arrows showing the direction of rotation during ship forward drive and the broken arrows showing the direction of rotation during ship reverse drive.

A planetary gear 6 for input and output shafts rotating in the same direction and a planetary gear 8 for shafts rotating in opposite directions are provided as differential gearing, arranged coaxially one behind the other. Planetary gear 6 for shafts rotating in the same direction includes an inside sun gear 10, a planet carrier 12 with planet pinions 14, and a rotatable ring gear 16. Planetary gear 8 for shafts rotating in opposite directions includes an inside sun gear 20, a rotatable planet carrier 22 with planet pinions 24, and an outside ring gear 26. Both sun gears 10 and 20 are Inonrotatably connected with an input shaft 30. Planet carrier 12 of planetary gear 6 is nonrotatably connected both with ring gear 26 of planetary gear 8 and also with an output shaft 32. Ring gear 16 of planetary gear 6 can be stopped by a brake band 34. Planet carrier 22 of the other planetary gear 8 can be stopped by another brake band 36. Input shaft 30, both planetary gears 6 and 8, and output shaft 32 together form the main gear train by which a ship screw 40 can be driven by a motor 38. Gear 16 and carrier 22 are reactions elements.

A parallel shaft includes a hydrodynamic coupling 50, of which the primary part 52 is mounted nonrotatably on a shaft 54. It is driven by gearwheel 56 mounted nonrotatably on it. This gearwheel is in contact with another gearwheel 58, which rests loosely on input shaft 30 and can be connected with input shaft 30 by a mechanical coupling 60. Mechanical coupling 60 is required so that the parallel shaft can be disconnected when main drive motor 38 is running at high speeds. Secondary part 62 of hydrodynamic coupling 50 rests nonrotatably on a secondary shaft 64, on which a gearwheel 66 is likewise nonrotatably mounted.

In the embodiment of FIG. 1, secondary gearwheel 66 couples with an outside gear 68 of ring gear 16 of planetary gear 6. When the main drive motor 38 is running at low speed, mechanical coupling 60 can therefore be closed whereupon the primary part 52 of hydrodynamic coupling 50 can be driven. Hydrodynamic coupling 50 exerts a more or less strong braking effect on ring gear 16 through secondary gear 66 according to the liquid level. The speed of output shaft 32 can therefore be regulated smoothly at low speeds down to zero.

Figure 2:
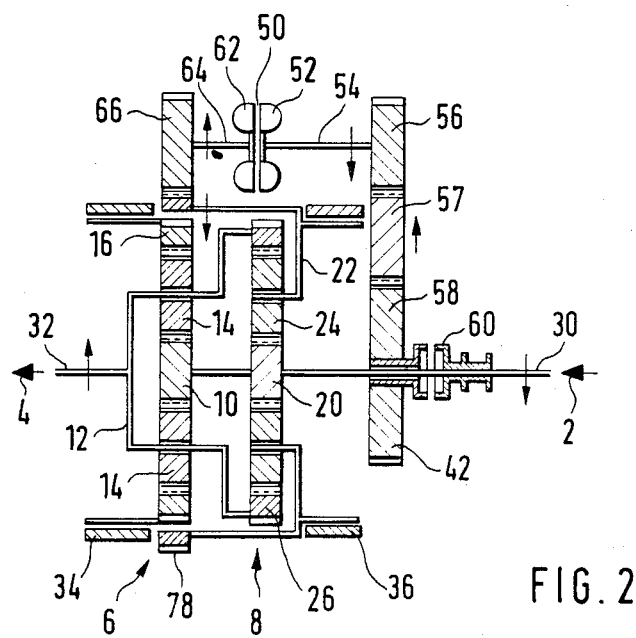
FIG. 2 is another embodiment of the ship gear train arrangement as in the invention with a device for regulation of lower output speeds using input and output shafts running counter to each other.

In the embodiment of FIG. 2, secondary gearwheel 66 is not engaged with planetary gear 6, but rather with an outside gearing 78 of planet carrier 22 of the other planetary gear 8. Thus, in the embodiment of FIG. 2, the speed of output shaft 32 of the ship can be regulated smoothly to zero speed when input and output shafts 30 and 32 are running counter to one another. A rotary direction reversal gearwheel 57 is mounted between gearwheels 56 and 58.

Figure 3:
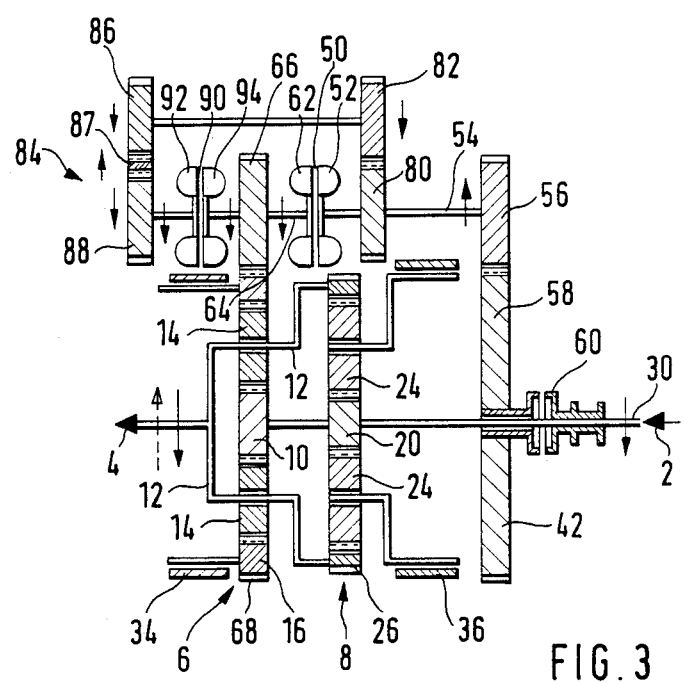
FIG. 3 is another ship gear train arrangement according to the invention with a device for regulation of the lower output speeds when moving forward or in reverse.

An additional gear wheel 80 in FIG. 3 is mounted on primary shaft 54 of hydrodynamic coupling 50, which drives a rotary direction reversal gear 84 through a gearwheel 82 with gearwheels 86, 87 and 88. The primary part 92 of another hydrodynamic coupling 90 is connected with the last gearwheel 88 of rotary direction reversal gear 84 and the secondary part 94 is connected with secondary gearwheel 66 of secondary part 62 of hydrodynamic coupling 50. Secondary wheel 66 engages with outside gearing 68 of ring gear 16 of planetary gear 6. When hydrodynamic coupling 50 is filled and the motor is at minimum speed, output shaft 32 can be regulated according to the fill level of this hydrodynamic coupling 50 down to zero speed while the other hydrodynamic coupling is emptied, and input shaft 30 and output shaft 32 rotate in the same direction. When the other hydrodynamic coupling 90 is filled, while hydrodynamic coupling 50 is emptied, and the direction of rotation of the motor and input shaft 30 remain the same, output shaft 32 rotates in reverse direction and with reversed direction of rotation. Its speed starting from zero can be changed by adjustment of the fill level of the other hydrodynamic coupling 90. Both hydrodynamic coupling 50 and 90 can be small in structure, since they are only for control, and need not transmit the ship driving power from main drive motor 38 to propeller 40.

We claim:

1. A ship gear train arrangment for smoothly adjusting a propeller speed down to zero comprising:

a main input shaft and a main output shaft;
a differential gearing, including a reaction element, which drivably connects said input shaft to said output shaft;
a hydrodynamic coupling means, located in parallel with said differential gearing and having a variable fill level, for coupling a point on said input shaft on the drive side of said differential gearing with said reaction element of said differential gearing such that the speed of said hydrodynamic coupling means influence the speed of said output shaft;
and further including a second hydrodynamic coupling means, located in parallel with said first-mentioned hydrodynamic coupling means and having a variable fill level and a rotary direction reversal gear, for coupling a point on said input shaft on the drive side of said differential gearing with said reaction element of said differential gearing such that the speed of said first-mentioned hydrodynamic coupling means influences the speed of said output shaft rotating in one direction when said second hydrodynamic coupling means is empty and said second hydrodynamic coupling means influences the speed of said output shaft rotating in a reverse direction when said first-mentioned hydrodynamic coupling means is empty.

2. A ship gear train arrangement as claimed in claim 1 wherein said differential gearing includes a planetary gear having a ring gear which connects said input and output shafts when said shafts are rotating in the same direction, and wherein said reaction element includes said ring gear.

3. A ship gear train arrangement as claimed in claim 2 wherein said differential gearing further includes a planetary gear having a rotating planet carrier which connects said input and output shafts when said shafts are rotating in the opposite direction, and wherein said reaction element includes said planet carrier.

4. A ship gear train arrangement as claimed in claim 1 wherein said hydrodynamic coupling means further includes a mechanical coupling means for separably coupling said hydrodynamic coupling means to said point on said input shaft.

* * * * *